US012795033B2

(12) United States Patent
Yoshida et al.

(10) Patent No.: US 12,795,033 B2
(45) Date of Patent: Nov. 10, 2026

(54) IMAGE FORMING APPARATUS AND INFORMATION PROCESSING APPARATUS CAPABLE OF COMMUNICATING WITH IMAGE FORMING APPARATUS

(71) Applicant: CANON KABUSHIKI KAISHA, Tokyo (JP)

(72) Inventors: Masatoshi Yoshida, Shizuoka (JP); Masato Suzuki, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 255 days.

(21) Appl. No.: 18/808,650

(22) Filed: Aug. 19, 2024

(65) Prior Publication Data

US 2025/0080678 A1 Mar. 6, 2025

(30) Foreign Application Priority Data

Aug. 29, 2023 (JP) ................................ 2023-138695

(51) Int. Cl.
*H04N 1/32* (2006.01)

(52) U.S. Cl.
CPC ..... *H04N 1/32635* (2013.01); *H04N 1/32651* (2013.01); *H04N 1/32694* (2013.01)

(58) Field of Classification Search
CPC ........... H04N 1/32635; H04N 1/32651; H04N 1/32694; B65H 7/02; B65H 1/04; G03G 15/553; G03G 2215/00341; G03G 2215/00548; G03G 2215/00721; G03G 15/70; G03G 15/55; G03G 15/6511
USPC ........................................................ 358/1.15
See application file for complete search history.

(56) References Cited

U.S. PATENT DOCUMENTS

| | | | | |
|---|---|---|---|---|
| 5,508,785 | A | 4/1996 | Takahashi | |
| 2004/0156055 | A1* | 8/2004 | Matsui | H04N 1/00074 358/401 |
| 2014/0086627 | A1 | 3/2014 | Tanabe | |
| 2014/0086628 | A1 | 3/2014 | Toriyama | |
| 2015/0284195 | A1* | 10/2015 | Kushida | B65H 1/18 271/157 |

(Continued)

FOREIGN PATENT DOCUMENTS

| | | | |
|---|---|---|---|
| JP | 2002128303 | A | 5/2002 |
| JP | 2005263382 | A | 9/2005 |

*Primary Examiner* — Allen H Nguyen
(74) *Attorney, Agent, or Firm* — Canon U.S.A., Inc. IP Division

(57) ABSTRACT

A system includes an image forming apparatus and at least one information processing apparatus, wherein the image forming apparatus includes a storage unit configured to store recording materials, a feeding unit configured to feed the recording materials, a support member configured to support the recording materials, a control unit including a first detection unit configured to detect a movement of the support member and a second detection unit configured to detect a conveyance failure, and a transmission unit configured to transmit data about the movement and data about a detection result to the at least one information processing apparatus, wherein the at least one information processing apparatus includes a storage unit configured to store the data transmitted from the transmission unit, and an analysis unit configured to analyze whether a cause of the conveyance failure is due to a replenishment of the recording materials.

10 Claims, 11 Drawing Sheets

(56) References Cited

U.S. PATENT DOCUMENTS

| | | | | |
|---|---|---|---|---|
| 2016/0103418 | A1 | 4/2016 | Yada | |
| 2017/0334222 | A1 | 11/2017 | Ichimiya | |
| 2018/0246460 | A1 * | 8/2018 | Sugano | B65H 1/266 |
| 2020/0148490 | A1 * | 5/2020 | Taba | B65H 7/02 |
| 2021/0182000 | A1 | 6/2021 | Kobayashi | |
| 2022/0179350 | A1 | 6/2022 | Hasegawa | |

* cited by examiner

IMAGE FORMING APPARATUS AND INFORMATION PROCESSING APPARATUS CAPABLE OF COMMUNICATING WITH IMAGE FORMING APPARATUS

BACKGROUND OF THE INVENTION

Field of the Invention

The present disclosure relates to an image forming apparatus such as a copier or a printer, and an information processing apparatus capable of communicating with the image forming apparatus.

Description of the Related Art

Sheet conveyance failures (such as paper jams) can occur when a paper replenishment unit acts to replenish paper to a sheet cassette storing remaining paper. To prevent sheet conveyance failures due to a reduced friction coefficient of a replenishment surface, the image forming apparatus discussed in Japanese Patent Application Laid-Open No. 2002-128303 uses a double feed prevention sheet between the remaining paper in the sheet cassette and the replenished paper.

However, it can still be difficult to determine the cause of a sheet conveyance failure in the image forming apparatus discussed in Japanese Patent Application Laid-Open No. 2002-128303.

SUMMARY OF THE INVENTION

According to an aspect of the present invention, a system includes an image forming apparatus and at least one information processing apparatus, wherein the image forming apparatus includes a storage unit configured to store recording materials, a feeding unit configured to feed the recording materials to be stored in the storage unit, a support member configured to support the recording materials and to be movable between a reference position and a feeding position where the recording materials are fed by the feeding unit, a control unit including a first detection unit configured to detect a movement of the support member from the reference position to the feeding position, and a second detection unit configured to detect a conveyance failure of the recording materials, and a transmission unit configured to transmit data about the movement detected by the first detection unit and data about a detection result by the second detection unit to the at least one information processing apparatus, wherein the at least one information processing apparatus includes a storage unit configured to store the data about the movement detected by the first detection unit and the data about the detection result transmitted from the transmission unit, and an analysis unit configured to analyze whether a cause of the conveyance failure is due to a replenishment of the recording materials, by using the data about the movement detected by the first detection unit and the data about the detection result stored in the storage unit.

Further features of the present invention will become apparent from the following description of examples with reference to the attached drawings.

DETAILED DESCRIPTION

An image forming apparatus 100 according to a first example will be described below with reference to FIG. 1. In the following descriptions and drawings, the Z direction indicates the vertical direction when the image forming apparatus 100 is installed on a horizontal surface. The Y direction indicates the direction that intersects the Z direction and coincides with the rotational axis direction of a photosensitive drum 115 (described below). The X direction indicates the direction intersecting with the Z and Y directions. Preferably, the X and Y directions are horizontal directions. Preferably, the X, Y, and Z directions perpendicularly intersect with each other. Referring to each drawing, the X, Y, and Z directions are referred to as the +X, +Y, and +Z sides, respectively, and the sides opposite to these sides are referred to as the −X, −Y, and −Z sides, respectively.

(Overall Configuration of Image Forming Apparatus)

Figure 1:
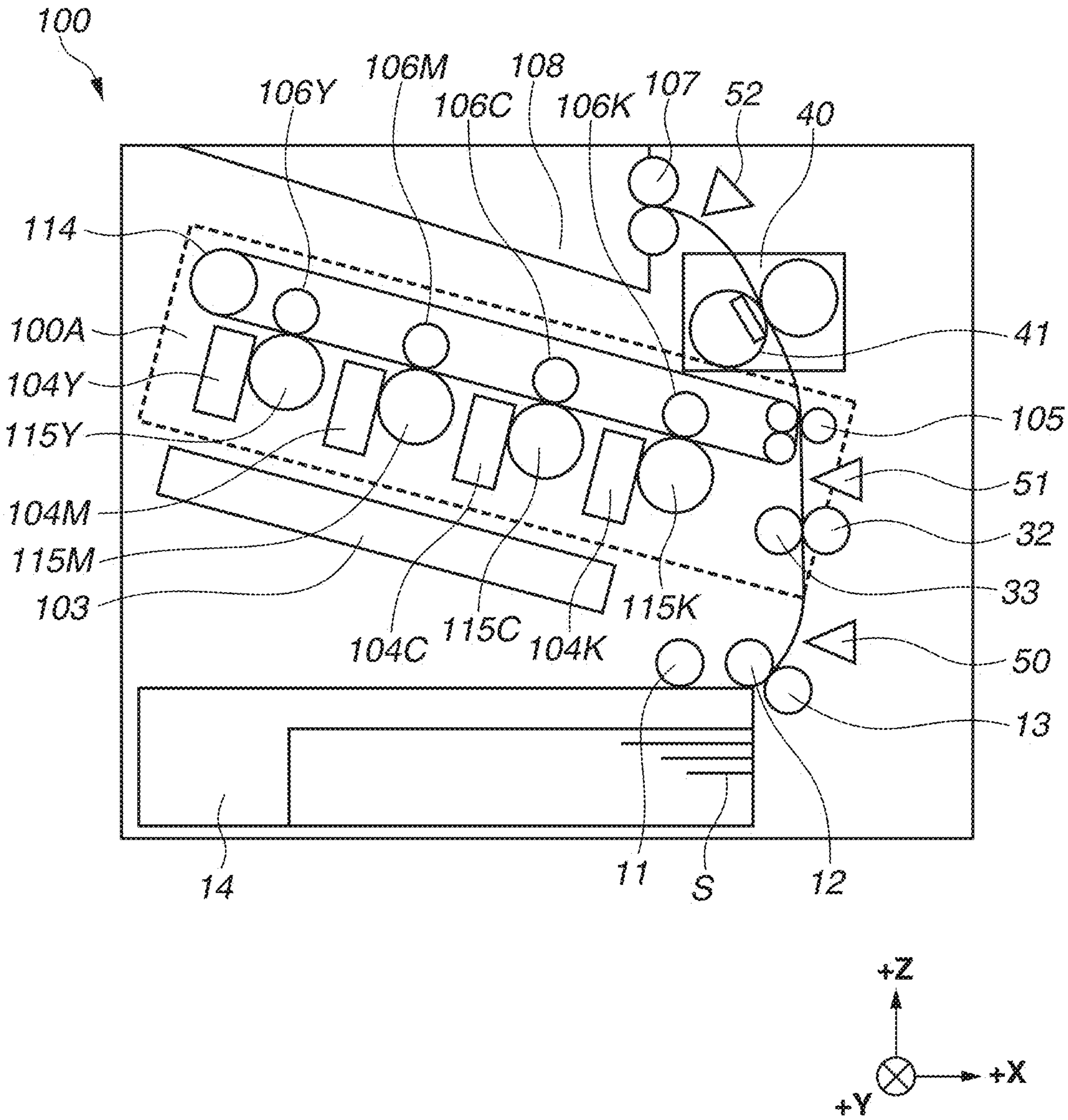
FIG. 1 is a schematic view illustrating an image forming apparatus according to a first example.

FIG. 1 is a schematic view illustrating the image forming apparatus 100. The present example indicates a color laser beam printer for forming toner images of four colors including yellow (Y), magenta (M), cyan (C), and black (K) as an example of the image forming apparatus 100. Diverse types of paper with different sizes and materials can be used for the image forming apparatus 100. Examples of usable recording materials include plain paper, thick paper, plastics films, cloths, surface-processed paper such as coated paper, and paper with special shapes such as envelopes and index paper.

The image forming apparatus 100 includes a scanner unit 103, photosensitive drums 115, developing cartridges 104, primary transfer rollers 106, a cassette 14, a pickup roller 11, a feed roller 12, a separation roller 13, a registration roller 32, a registration counter roller 33, a secondary transfer roller 105, a fixing unit 40, a discharge roller pair 107, a discharge tray 108, a first detection sensor 50, a second detection sensor 51, and a third detection sensor 52.

The scanner unit 103 forms an electrostatic latent image based on image data on the photosensitive drums 115. The photosensitive drums 115 (115Y to 115K) are image carriers for an electrostatic latent image. The developing cartridges 104 (104Y to 104K) each storing a developer develop the electrostatic latent images on the photosensitive drums 115 (115Y to 115K), respectively, with a toner. The primary transfer rollers 106 (106Y to 106K) serve as transfer units for transferring the toner images on the photosensitive drums 115 to an intermediate transfer belt 114. The cassette 14 serves as a storage unit for storing sheets S. The cassette 14 can be attached to and detached from the image forming apparatus 100 by being inserted and pulled in the X direction. More specifically, the cassette 14 can be detached from the image forming apparatus 100 by being pulled in the –X direction, and attached to the image forming apparatus 100 by being pushed in the +X direction. The pickup roller 11 in contact with a sheet S supported by the cassette 14 serves as a feed unit for feeding the sheet S to the feed roller 12 and the separation roller 13. The feed roller 12 and the separation roller 13 separate each of the sheets S sent from the pickup roller 11 and convey the sheet to the transfer roller 105. The registration roller 32 and the registration counter roller 33 convey the sheet at suitable timing so that the toner image on the intermediate transfer belt 114 is transferred onto the sheet by the secondary transfer roller 105. The secondary transfer roller 105 transfers the image having been transferred onto the intermediate transfer belt 114, onto the sheet. The fixing unit 40 heats and pressurizes the sheet to fix the image having been transferred by the secondary transfer roller 105. The sheet having passed the fixing unit 40 is discharged onto the discharge tray 108 by the discharge roller pair 107. The first detection sensor 50, the second detection sensor 51, and the third detection sensor 52 are sensors (third detection unit) for detecting the recording material passing through the conveyance path. The first detection sensor 50 is disposed downstream of the feed roller 12 and upstream of the registration roller 32 in the conveyance direction in which the recording material is conveyed on the conveyance path. The second detection sensor 51 is disposed downstream of the registration roller 32 and upstream of the secondary transfer roller 105 in the conveyance direction in which the recording material is conveyed on the conveyance path. The third detection sensor 52 is disposed downstream of the fixing unit 40 and upstream of the discharge roller pair 107 in the conveyance direction in which the recording material is conveyed on the conveyance path.

(Configuration of Communication System)

Figure 2:
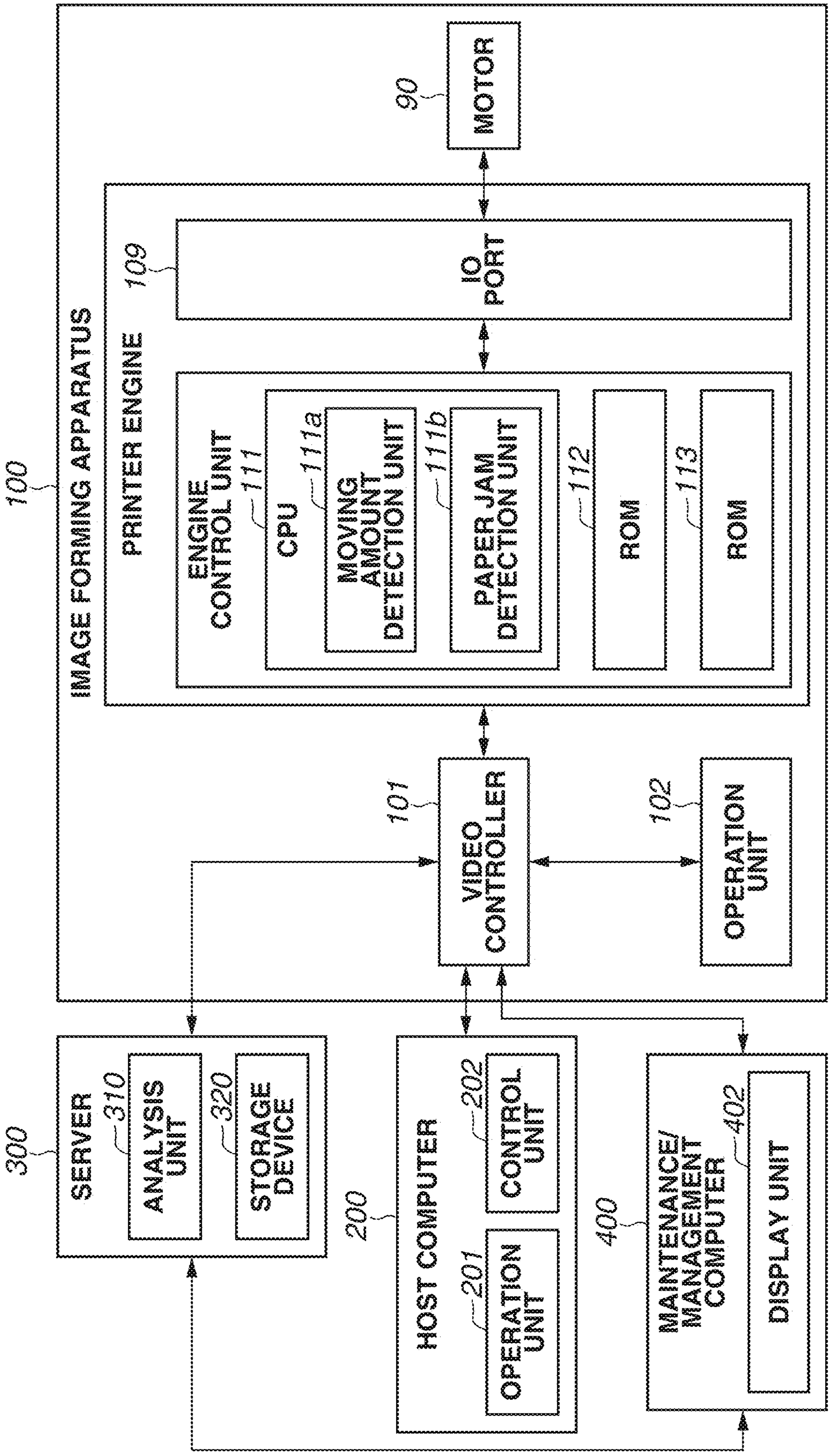
FIG. 2 is a schematic view illustrating a communication system according to the first example.

The communication system according to the present example will be described below. This system includes the image forming apparatus 100, a host computer 200, a server 300, and a maintenance/management computer 400. FIG. 2 illustrates the overview of the communication system according to the present example.

The host computer 200 is capable of communicating with the image forming apparatus 100 (video controller 101). The host computer 200 transmits a print job to the video controller 101 of the image forming apparatus 100. The host computer 200 includes an operation unit 201 and a control unit 202. The operation unit 201 serves as an input unit, including a keyboard and a touch panel, for allowing the user to input information to the host computer 200. The control unit 202 is a central processing unit (CPU) that transmits a print job including image data according to input information input from the operation unit 201.

The image forming apparatus 100 includes a motor 90, an input/output (I/O) port 109, a CPU 111, a read only memory (ROM) 112, a random access memory (RAM) 113, the video controller 101, and an operation display unit 102. The video controller 101 serves as a communication unit for communicating with the host computer 200, the server 300, and the maintenance/management computer 400. The video controller 101 serves as a transmission unit for transmitting data about the moving amount (e.g., amount of movement) detected by the moving amount detection unit 111*a* (first detection unit) and data about the detection result by the paper jam detection unit 111*b* (second detection unit described below) to the server 300. The video controller 101 receives a print job from the host computer 200 and controls image formation based on the print job. The ROM 112 is a nonvolatile memory for retaining and storing control programs and various data. A rewritable nonvolatile memory can be used instead of the ROM 112. The CPU 111 executes a control program stored in the ROM 112 to control the motor 90 via the I/O port 109. The motor 90 serves as a driving source for driving the above-described various members of the image forming apparatus 100. Examples of driving sources for the image forming apparatus 100 include a feed motor, a photosensitive member motor, a fixing motor, and a stepping motor. The feed motor is a drive unit for driving the pickup roller 11, the feed roller 12, and the separation roller 13. The photosensitive member motor is a drive unit for driving the photosensitive drum 115. The fixing motor is a drive unit for driving a pressure roller 41 of the fixing unit 40. The stepping motor is a drive unit for driving a support member (e.g., a support plate 17 described below). The RAM 113 is a volatile memory for storing temporary data. The RAM 113 is a storage unit for storing the total moving amount and the detection result of the paper jam detection (described below). The operation unit 102 includes an input unit and a display unit. The user can input print conditions to the input unit. The input unit included in the operation unit 102 can display a notification.

The maintenance/management computer 400 is capable of communicating with the video controller 101 of the image forming apparatus 100 and the server 300. The maintenance/management computer 400 is, for example, a computer used by a dealer. The maintenance/management computer 400 is capable of monitoring the status of the image forming apparatus 100 and notifying the image forming apparatus 100 of the status. The maintenance/management computer 400 is also capable of receiving information notified from the server 300 and displaying the information via a display unit 402.

Figure 3A:
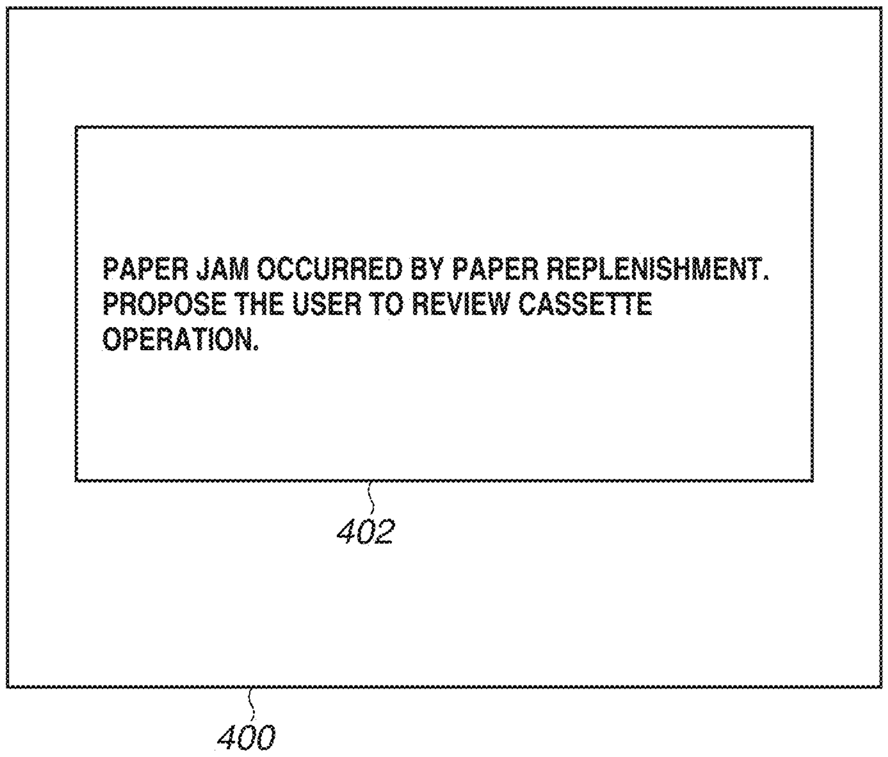
FIGS. 3A and 3B are schematic views illustrating a display unit according the first example.
Figure 3B:
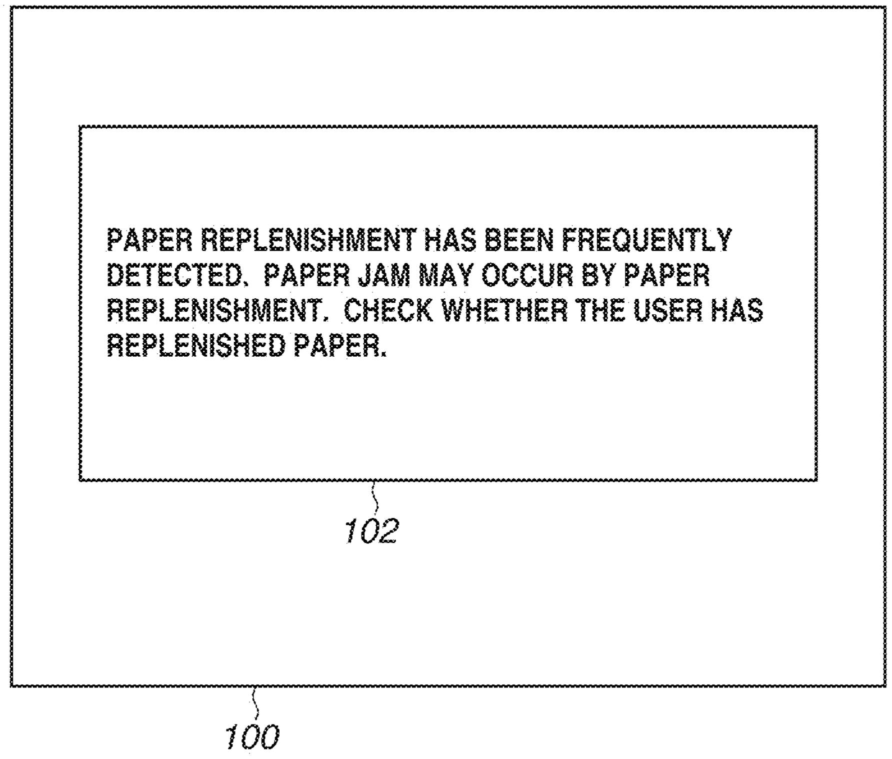

The server 300 is a computer (information processing apparatus) for identifying whether the cause of a failure is the paper replenishment (described below). According to the example, the paper replenishment refers to an action to replenish recording materials to the cassette 14 in which recording materials are stored. The server 300 is capable of communicating with the video controller 101 of the image forming apparatus 100. The server 300 is capable of communicating with the maintenance/management computer 400. The server 300 includes an analysis unit 310 and a storage device 320. The storage device 320 includes optional volatile and nonvolatile storage devices. In addition to the program to be executed by the analysis unit 310, the storage device 320 can store the data about the moving amount detected by the moving amount detection unit 111*a* and the data about the detection result by the paper jam detection unit 111*b* (described below). The analysis unit 310 including at least one processor (CPU) executes a control program stored in the storage device 320. The analysis unit 310 analyzes whether the cause of a conveyance failure is the paper replenishment, by using the data about the moving amount detected by the moving amount detection unit 111*a* and the data about the detection result by the paper jam detection unit 111_b_ stored in the storage device 320. Although, according to the example, the analysis unit 310 and the storage device 320 are stored in one server 300, these units may be separately stored in at least one server (information processing apparatus). More specifically, this system may include one or more servers. If the analysis unit 310 identifies that the cause of a failure of the image forming apparatus 100 is the paper replenishment, the server 300 notifies the image forming apparatus 100 or the maintenance/management computer 400 of information based on an analysis result. The server 300 may transmit the relevant information to devices other than the image forming apparatus 100 and the maintenance/management computer 400. FIGS. 3A and 3B illustrate examples of information notified by the server 300. FIG. 3A illustrates a state where the display unit 402 displays the information notified from the server 300 to the maintenance/management computer 400. FIG. 3B illustrates a state where the display of the operation unit 102 displays the information notified from the server 300 to the image forming apparatus 100. Referring to FIG. 3A, the notified information includes an analysis result and a countermeasure for a conveyance failure. Upon reception of these pieces of information by the maintenance/management computer 400, the dealer can take suitable measures for the defective image forming apparatus 100. The notified information may include at least either one of the analysis result and the countermeasure for a conveyance failure.

Referring to FIG. 3B, the user is notified of a caution.

(Configuration of Support Member)

Figure 4A:
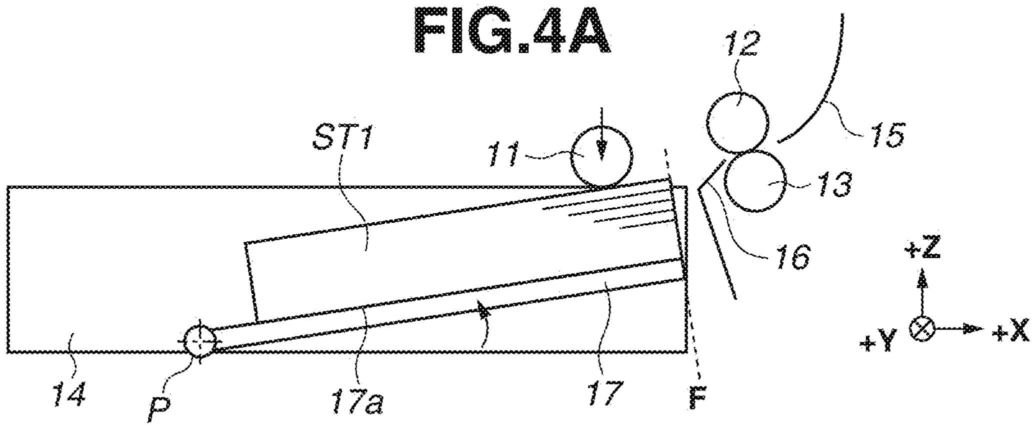
FIGS. 4A, 4B, 4C, and 4D are schematic views illustrating a cassette according the first example.
Figure 4B:
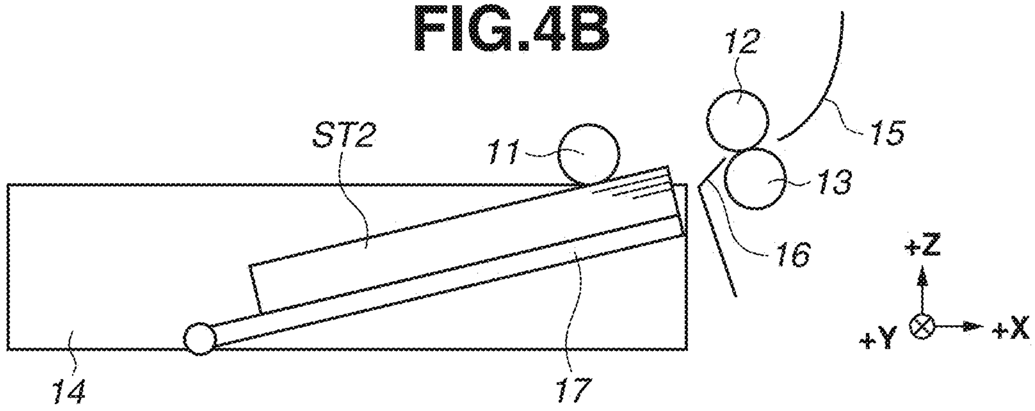
Figure 4C:
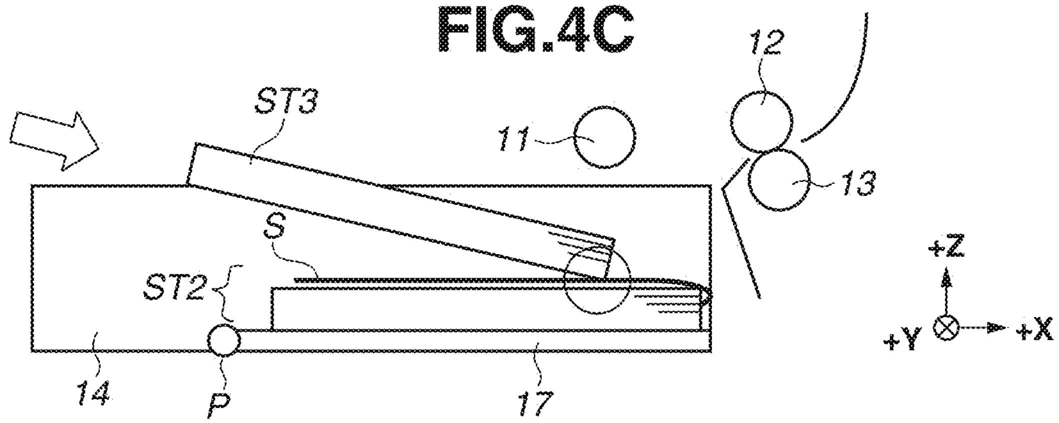

A paper feed operation of the image forming apparatus 100 according to the present example will be described below. The cassette 14 includes a support member (e.g., support plate 17). FIG. 4A is a schematic view illustrating the cassette 14. As illustrated in FIG. 4A, the support plate 17 serves as a support unit for supporting paper. There is a rotation axis P at the −X direction side end of the support plate 17. The support plate 17 rotates around the rotation axis P in the counterclockwise direction when viewed from the +Y direction. The support plate 17 is connected with a stepping motor (not illustrated) and rotated by the stepping motor. More specifically, the rotation amount of the support plate 17 is limited by a pulse signal input to the stepping motor as a drive unit. As illustrated in FIG. 4C, the support plate 17 can take the reference position where the +X direction side end of the support plate 17 is in contact with the bottom surface of the cassette 14. The support plate 17 is movable from the reference position to the feeding position (FIG. 4A) where the uppermost sheet comes into contact with the pickup roller 11 and then is fed. The support plate 17 is also movable from the feeding position to the reference position. In other words, the support plate 17 is movable between the reference and feeding positions. According to the present example, the reference position refers to the position where the +X direction side end of the support plate 17 is in contact with the bottom surface of the cassette 14. However, the reference position is not limited to this position but may be set to an optional position.

Figure 5A:
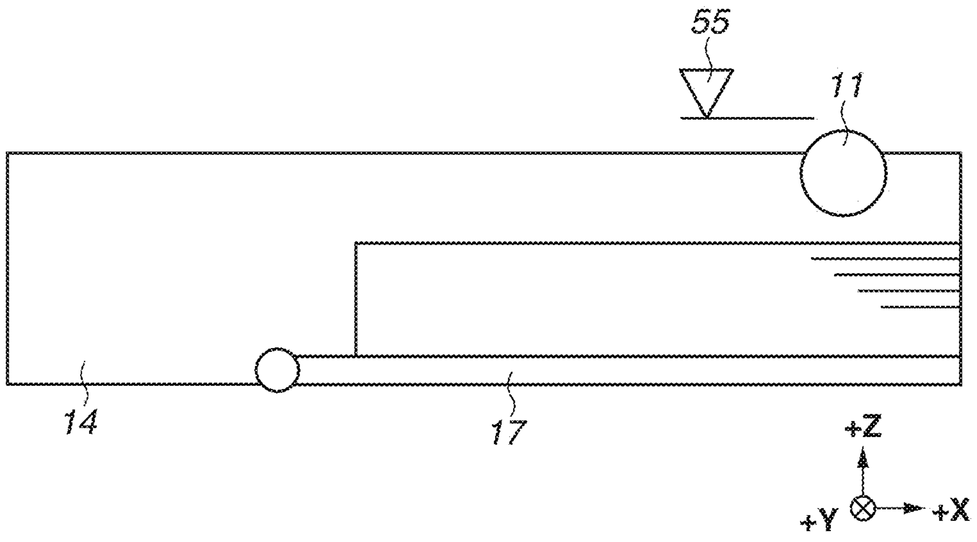
FIGS. 5A and 5B are schematic views illustrating the cassette and a photo sensor according to the first example.
Figure 5B:
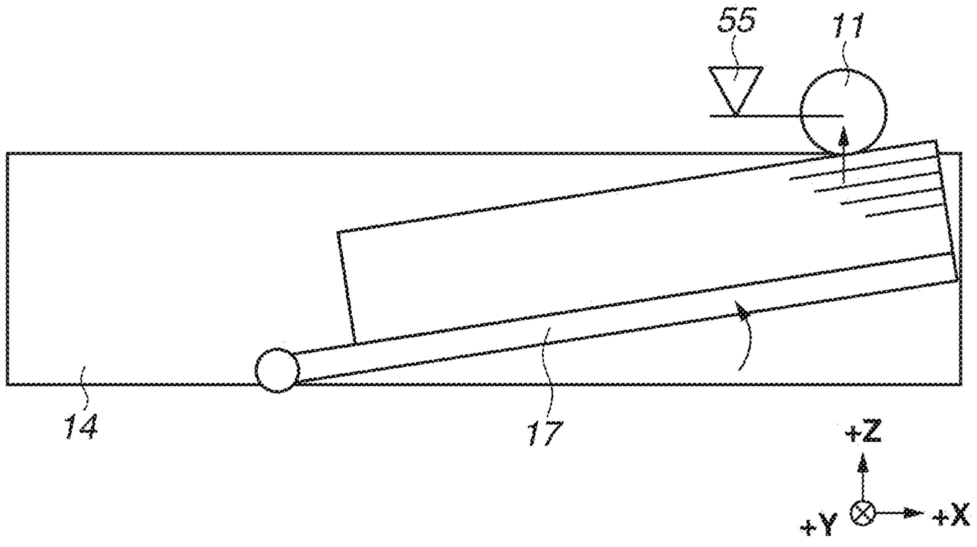

A method for detecting that the support plate 17 has reached the feeding position will be described below with reference to FIGS. 5A and 5B. FIGS. 5A and 5B illustrate the method for detecting that the support plate 17 has reached the feeding position. The image forming apparatus 100 includes a photo sensor 55 that serves as a detection unit for detecting that the pickup roller 11 has reached the feeding position. When the support plate 17 moves from the reference position (FIG. 5A) to the feeding position (FIG. 5B), the paper supported by the support plate 17 comes into contact with the pickup roller 11 and moves the pickup roller 11 in the +Z direction. When the shielding member on the holder for supporting the pickup roller 11 changes the transmission state of the photo sensor 55 to the shielded state, the photo sensor 55 detects that the support plate 17 has reached the feeding position.

(Occurrence of Paper Jam by Paper Replenishment)

Figure 4D:
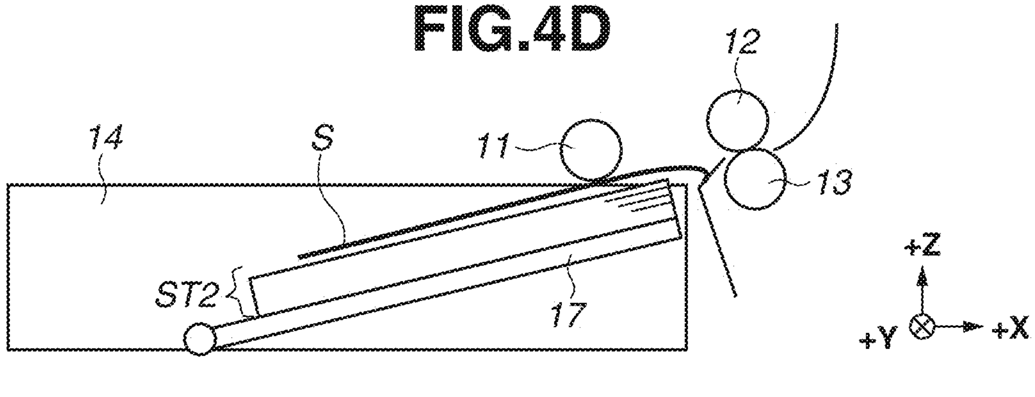

A process in which a paper jam occurs by the paper replenishment will be described below with reference to FIGS. 4A to 4D. FIG. 4A illustrates a state where sheets ST1 are stacked on the cassette 14, and the pickup roller 11 is about to feed a sheet. FIG. 4B illustrates a state where sheets have been fed in the state in FIG. 4A, and the number of sheets ST1 has decreased to ST2 which is a half of ST1. FIG. 4C illustrates a state where sheets ST3 are being replenished to the sheets ST2 in FIG. 4B. FIG. 4D illustrates a state where, after the sheets ST3 have been replenished in FIG. 4C, sheets are fed, and a paper jam is about to occur. As illustrated in FIG. 4C, when the sheets ST3 are replenished to the cassette 14, the uppermost sheet S of the sheets ST2 is pushed in the +X direction by the sheets ST3 and comes into contact with the +X direction side end of the cassette 14, and then the leading edge of the sheet S may be bend. If the sheet S is conveyed in this state, a paper jam may occur in the middle of the conveyance path. This completes the description of the process of a paper jam occurrence.

(Method for Identifying Cause of Paper Jam)

Figure 6:
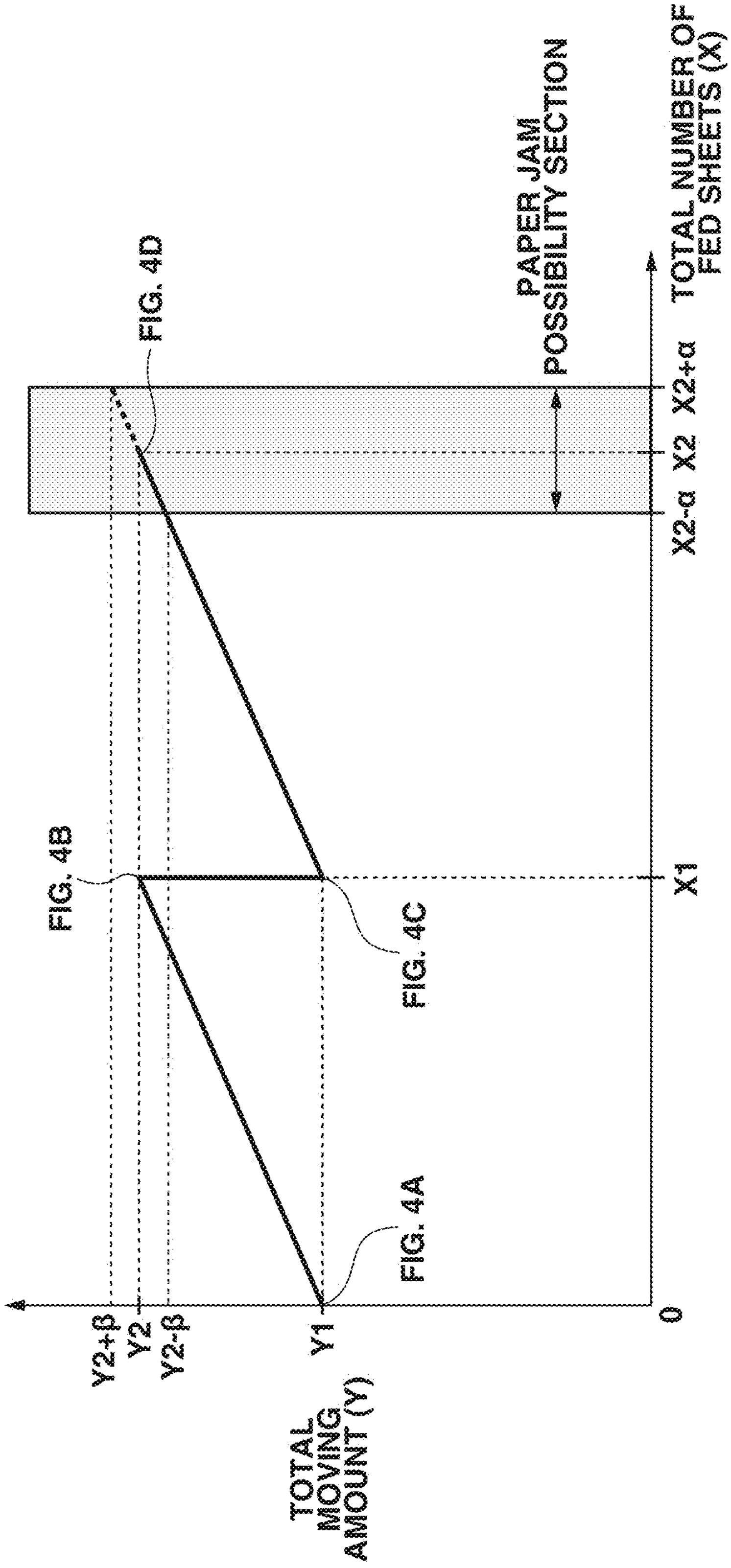
FIG. 6 illustrates a relation between the total moving amount and the total number of fed sheets according to the first example.

A method for identifying whether the cause of a paper jam is the paper replenishment will be described below with reference to FIGS. 4 to 6. FIG. 6 illustrates a relation between the total number of fed sheets (X) and the total moving amount (Y) of the support plate 17. The total moving amount illustrated in FIG. 6 is the moving amount required by the support plate 17 to move from the reference position to the feeding position. According to the present example, the moving amount refers to the number of pulse signals that need to be input to the stepping motor in order for the support plate 17 to move from the reference position to the feeding position. The number of pulse signals is detected by the moving amount detection unit 111_a_ in the CPU 111.

Unlike the present example, the moving amount detection unit 111_a_ may also detect the driving time of the stepping motor required to move the support plate 17 from the reference position to the feeding position, and consider the driving time as the moving amount. More specifically, a parameter that changes when the support plate 17 moves from the reference position to the feeding position may be employed. The moving amount is not limited to the number of pulse signals and the driving time of the stepping motor.

The total number of fed sheets (X) illustrated in FIG. 6 refers to the cumulative number of sheets fed by the pickup roller 11. FIG. 6 illustrates the total moving amount and the total number of fed sheets in the states in FIGS. 4A to 4D. In the state in FIG. 4A, the total moving amount is Y1. The image forming apparatus 100 receives a print job in the state in FIG. 4A, and the pickup roller 11 feeds sheets. Accordingly, the number of sheets decreases, and the position of the uppermost sheet moves in the −Z direction. The CPU 111 performs control so that the support plate 17 moves in the +Z direction each time a predetermined number of sheets are fed, allowing the uppermost sheet stacked on the cassette 14 to be fed. If the feeding position of the support plate 17 is adjusted, the moving amount detection unit 111_a_ detects the moving amount of the support plate 17 and stores the data about the detected moving amount in the RAM 113. When the apparatus 100 performs printing in the state in FIG. 4A and the total number of fed sheets has reached X1 (state in FIG. 4B), the total moving amount has increased to Y2. In the state in FIG. 4C, the sheets ST3 are replenished to the cassette 14 in the state in FIG. 4B. Accordingly, the total moving amount has decreased again to Y1. When the apparatus 100 performs printing again in the state in FIG. 4C, the moving amount gradually increases. When the total number of fed sheets reaches X2, the moving amount reaches Y2 again (FIG. 4D). Referring to FIG. 4D, a paper jam may occur, as described above. If the decrease in the total moving amount exceeds a predetermined amount in this way, paper has possibly been replenished. More specifically, the CPU 111 detects the paper replenishment by determining whether the decrease in the total moving amount exceeds the predetermined amount. When the total moving amount reaches the value immediately before the paper replenishment again, a paper jam may possibly occur. Accordingly, if the total moving amount reaches the value immediately before the paper replenishment, and the occurrence of a paper jam is detected, the CPU 111 can identify that the cause of the occurrence of a paper jam is the paper replenishment.

The CPU 111 identifies whether a paper jam has occurred by using the first detection sensor 50, the second detection sensor 51, and the third detection sensor 52. The CPU 111 includes the paper jam detection unit 111*b* for measuring the conveyance time after the pickup roller 11 feeds a sheet and until each of the first detection sensor 50, the second detection sensor 51, and the third detection sensor 52 detects the passage of the sheet. If the conveyance time is not included in a predetermined threshold value, the CPU 111 identifies that a paper jam (conveyance failure) has occurred. According to the present example, the CPU 111 measures the conveyance time for each fed sheet, detects whether a paper jam has occurred via the paper jam detection unit 111*b*, and stores the data about the detection result in the RAM 113.

According to the present example, a range including an error ±β from Y2 is set as a section where a paper jam may possibly occur (hereinafter referred to as a paper jam possibility section). If the occurrence of a paper jam is detected in this section $Y2-\beta<Y2<Y2+\beta$, the CPU 111 identifies that the cause of the paper jam is the paper replenishment. An error is included in the relevant section in this way because the theoretical total number of fed sheets with which a paper jam occurs is different from the actual total number of fed sheets. This difference is caused by wiring resistance variations and rotor tolerance of the stepping motor.

As described above, according to the present example, whether the cause of the occurrence of the paper jam is the paper replenishment is identified in the following way. The feeding position at a first time point is a first position. The feeding position at a second time point later than the first time point is a second position. The feeding position at a third time point later than the second time point is a third position. The moving amount (total moving amount) required for the cassette 14 to be moved from the reference position to the first position is a first moving amount. The moving amount (total moving amount) required for the cassette 14 to be moved from the reference position to the second position is a second moving amount. The moving amount (total moving amount) required for the cassette 14 to be moved from the reference position to the third position is a third moving amount. If the second moving amount is smaller than the first moving amount, the third moving amount is included in a predetermined threshold value range including the first moving amount, and a conveyance failure of the recording material fed at the third time point is detected by the paper jam detection unit 111*b*, the analysis unit 310 identifies that the cause of the paper jam (conveyance failure) is the paper replenishment.

(Processing Flow for Identifying Cause of Paper Jam)

Figure 7:
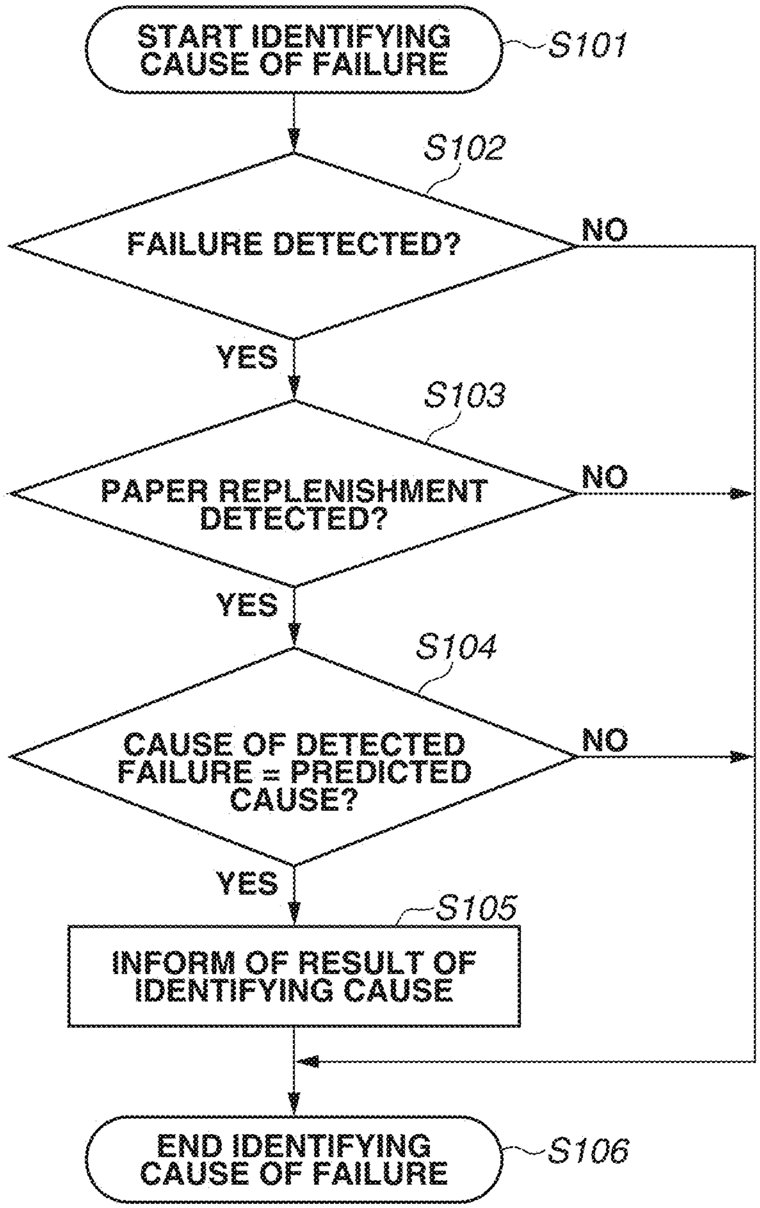
FIG. 7 is a flowchart illustrating processing for identifying the paper replenishment according to the first example.

A processing flow for identifying a cause of a paper jam performed by the analysis unit 310 of the server 300 will be described below with reference to FIG. 7. The total moving amount and the detection result by the paper jam detection unit 111*b* stored in the RAM 113 are transmitted to the server 300 by the video controller 101. In step S101, the analysis unit 310 starts identifying a cause of a paper jam by using data about the total moving amount and the data about the detection result by the paper jam detection unit 111*b*. In step S102, the analysis unit 310 refers to the data about the detection result by the paper jam detection unit 111*b* to determine whether a paper jam has been detected. In a case where a paper jam is not detected (NO in step S102), the processing proceeds to step S106. In step S106, the analysis unit 310 ends identifying the cause. In a case where a paper jam is detected (YES in step S102), the processing proceeds to step S103. In step S103, the analysis unit 310 detects whether paper has been replenished. The analysis unit 310 detects whether paper has been replenished by determining whether the decrease in the total moving amount exceeds the predetermined amount, as described above. In a case where the paper replenishment is not detected (NO in step S103), the processing proceeds to step S106. In step S106, the analysis unit 310 ends identifying the cause. In a case where the paper replenishment is detected (YES in step S103), the processing proceeds to step S104. In step S104, the analysis unit 310 identifies whether the total moving amount has reached the value immediately before the paper replenishment, analyzes whether the occurrence of a paper jam is detected, and identifies whether the cause of the paper jam is the paper replenishment, as described above. In a case where the cause of the paper jam is not identified to be the paper replenishment (NO in step S104), the processing proceeds to step S106. In step S106, the analysis unit 310 ends identifying the cause. In a case where the cause of the paper jam is identified to be the paper replenishment (YES in step S104), the processing proceeds to step S105. In step S105, the analysis unit 310 notifies the image forming apparatus 100 or the maintenance/management computer 4002 of the result of identifying the cause of the paper jam, as described above. After notifying of the result of the identifying the cause of the paper jam, then in step S106, the analysis unit 310 ends identifying the cause.

As described above, the communication system including the image forming apparatus 100, the server 300, the host computer 200, and the maintenance/management computer 400 according to the present example identifies that the cause of the paper jam occurring in the image formation is the paper replenishment, and notifies the user of the cause of the paper jam. More specifically, the communication system identifies whether the cause of the paper jam is the paper replenishment based on the data about the total moving amount and the data about the detection result by the paper jam detection unit 111*b*. This enables the user to take suitable measures for the image forming apparatus 100 in which the paper jam has occurred.

Figure 8:
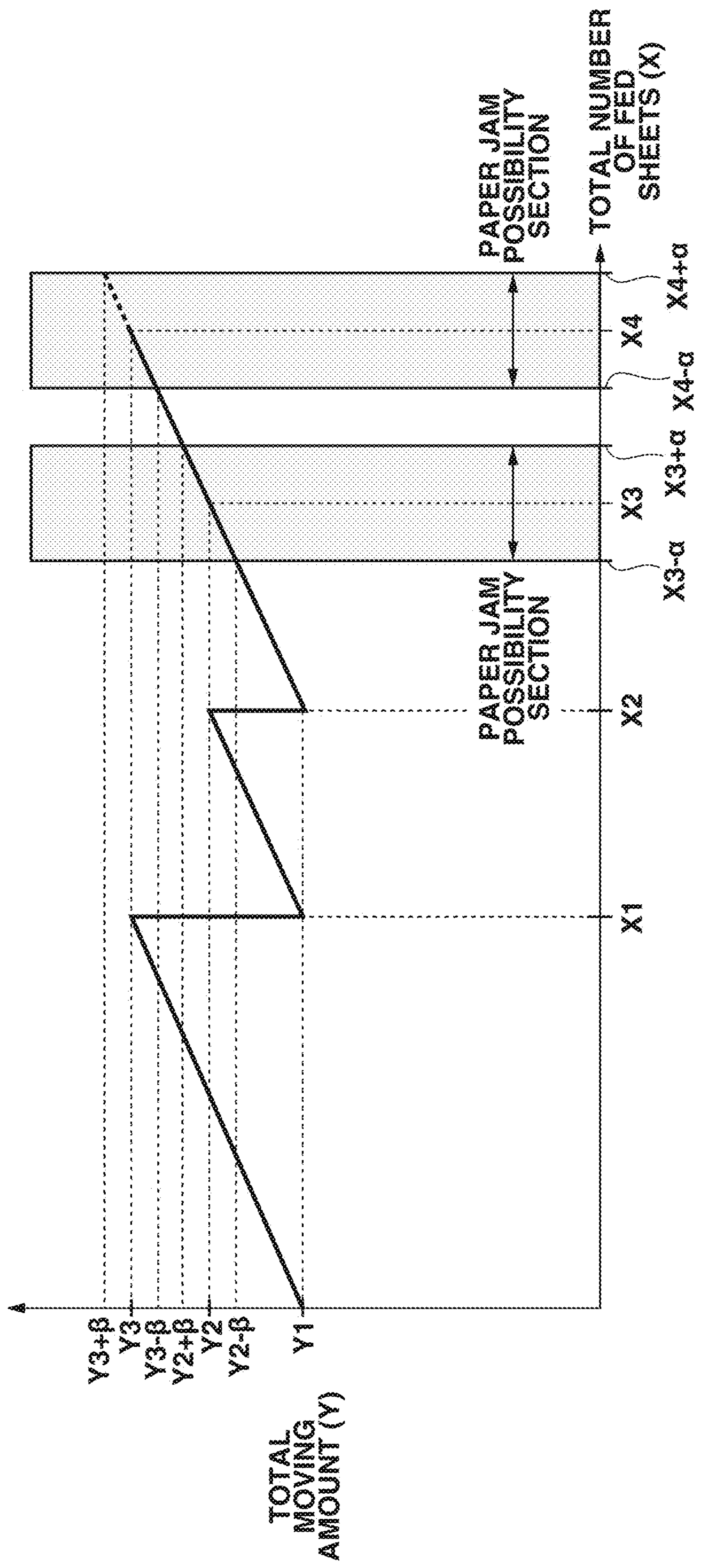
FIG. 8 illustrates a relation between the total moving amount and the total number of fed sheets according to the first example.

Although, according to the present example, the server 300 identifies the cause of the paper jam, the image forming apparatus 100 may identify the cause of the paper jam, unlike the present example. In this case, the Image forming apparatus 100 includes the analysis unit 310 and the storage device 320. According to the present example, if the analysis unit 310 detects the occurrence of a paper jam in a section X2−α<X2<X2+α, the analysis unit 310 notifies the user of the paper jam. However, even if the analysis unit 310 does not detect the occurrence of a paper jam, the analysis unit 310 may notify the user of a paper jam when the paper replenishment is detected, unlike the present example. For example, if the user who frequently replenishes paper is notified of a caution, the occurrence of a paper jam can be restricted. Although the present example has been described above centering on a case where the user replenishes paper once, the method according to the present example enables identifying the cause of the paper jam even if the user replenish paper more than once. FIG. 8 illustrates a relation between the total number of fed sheets (X) and the total moving amount (Y) in a case where the user replenishes paper more than once. If the user replenishes paper more than once, there are two different sections X3±α and X4±α as paper jam possibility sections. The analysis unit 310 performs the above-described analysis for identifying the cause of a paper jam in these two sections to identify whether the cause of the paper jam having occurred in each section is the paper replenishment.

A second example will be described below. The first example has been described above centering on an example case where the leading edge of a sheet is bent by the paper replenishment, resulting in a paper jam. The second example will be described below centering on an example case where the reduced friction coefficient of the replenishment surface causes a mistaken notification of the occurrence of a paper jam, and an algorithm for identifying whether the cause of the paper jam is the paper replenishment. Members identical to those according to first example are assigned the same reference numerals as those in the first example, and duplicated descriptions thereof will be omitted.

Figure 9A:
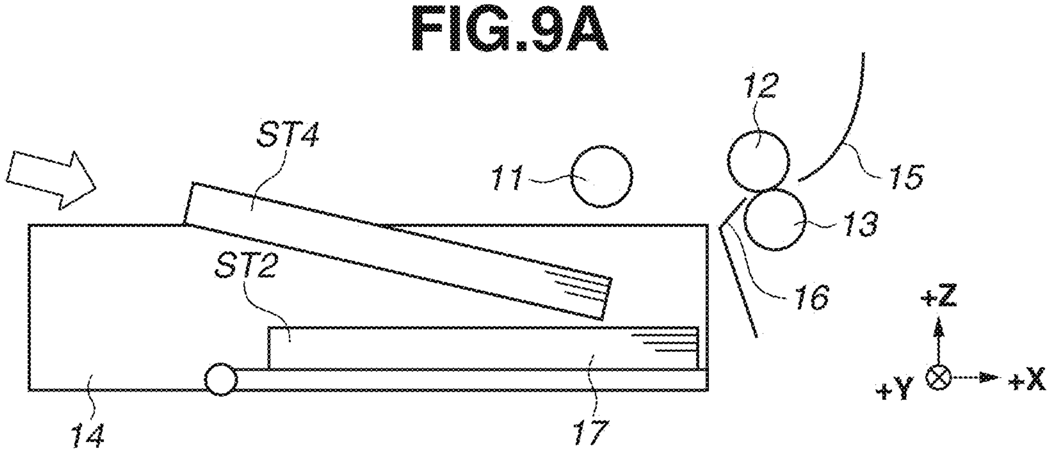
FIGS. 9A, 9B, and 9C are schematic views illustrating a cassette according a second example.
Figure 9B:
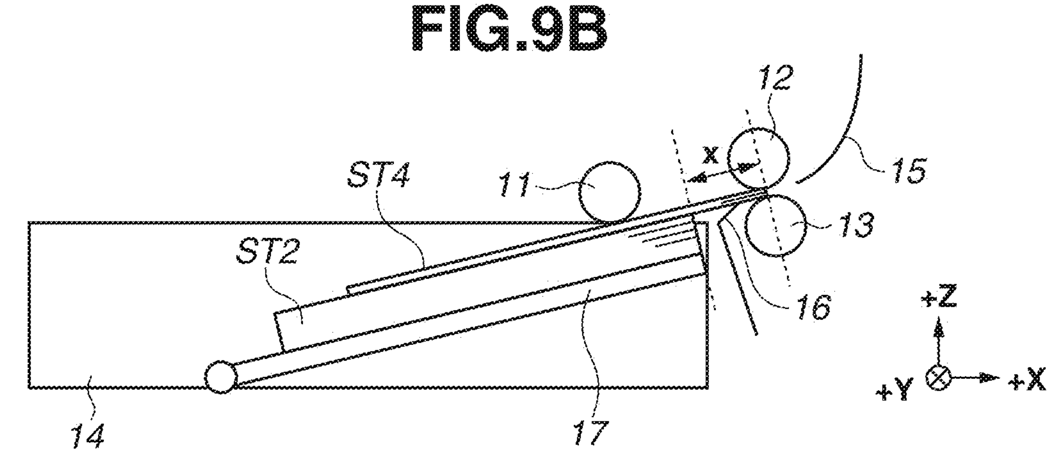
Figure 9C:
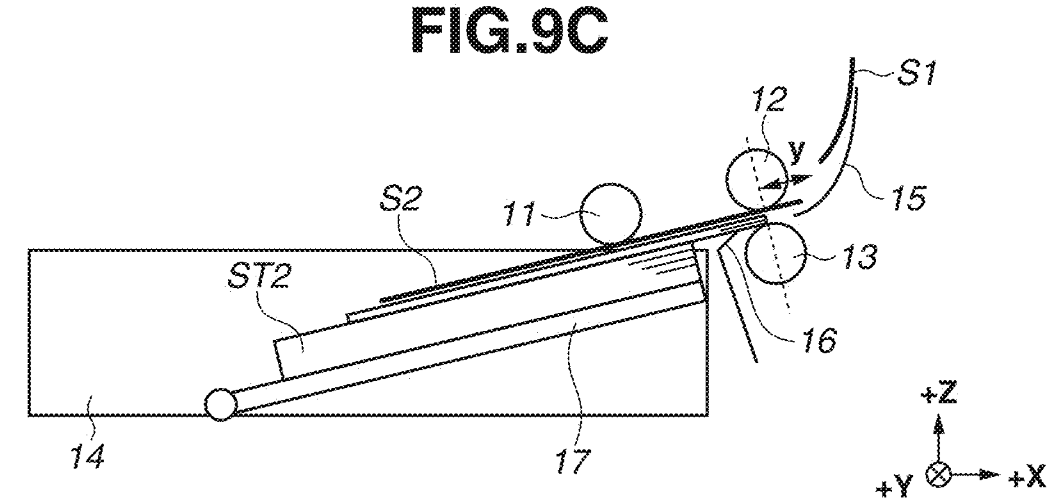

FIGS. 9A to 9C illustrate a mechanism of a mistaken notification of occurrence of a paper jam according to the present example. FIG. 9B illustrates a state where sheets ST4 are being replenished to the cassette 14 in the state in FIG. 4A. FIG. 9B illustrates a state where the paper feed progresses after the state in FIG. 9A. FIG. 9C illustrates a state where the paper feed further progresses after the state in FIG. 9B. If paper is replenished in the state in FIG. 9A, the friction coefficient μ of the contact surface between the sheets ST4 and ST2 is smaller than the friction coefficients μ of the sheets ST4 and ST2 because of the influence of an air layer produced during the paper replenishment. If the friction coefficient μ is small, when the number of remaining replenished sheets ST4 has decreased to about 10, all of the sheets ST4 are conveyed to the nip portion between the feed roller 12 and the separation roller 13 by the conveyance force of the pickup roller 11. As illustrated in FIG. 9B, all of the sheets ST4 are moved by the distance x from the leading edge of the sheets ST2 to the nip portion between the feed roller 12 and the separation roller 13. In this state, the nip portion formed by the feed roller 12 and the separation roller 13 is separated by the thickness of the sheets ST4. In this state, the separation roller 13 is unable to separate and feed the sheets ST4 one by one. As illustrated in FIG. 9C, a sheet S2 following a preceding sheet S1 is conveyed and then stops when the position of the sheet S2 advances by a distance y from the nip position. If the pickup operation starts in this state, the sheet interval defined by the trailing edge of the preceding sheet S1 and the leading edge of the following sheet S2 is reduced by the distance y. As a result, the interval between the preceding and the following sheets becomes a tolerance or less, and the image forming apparatus 100 determines that the image forming process is difficult, stops the printing operation, and notifies the user of a paper jam. This completes the description of the mechanism of a mistaken notification of the occurrence of the paper jam based on the reduced friction coefficient.

Figure 10:
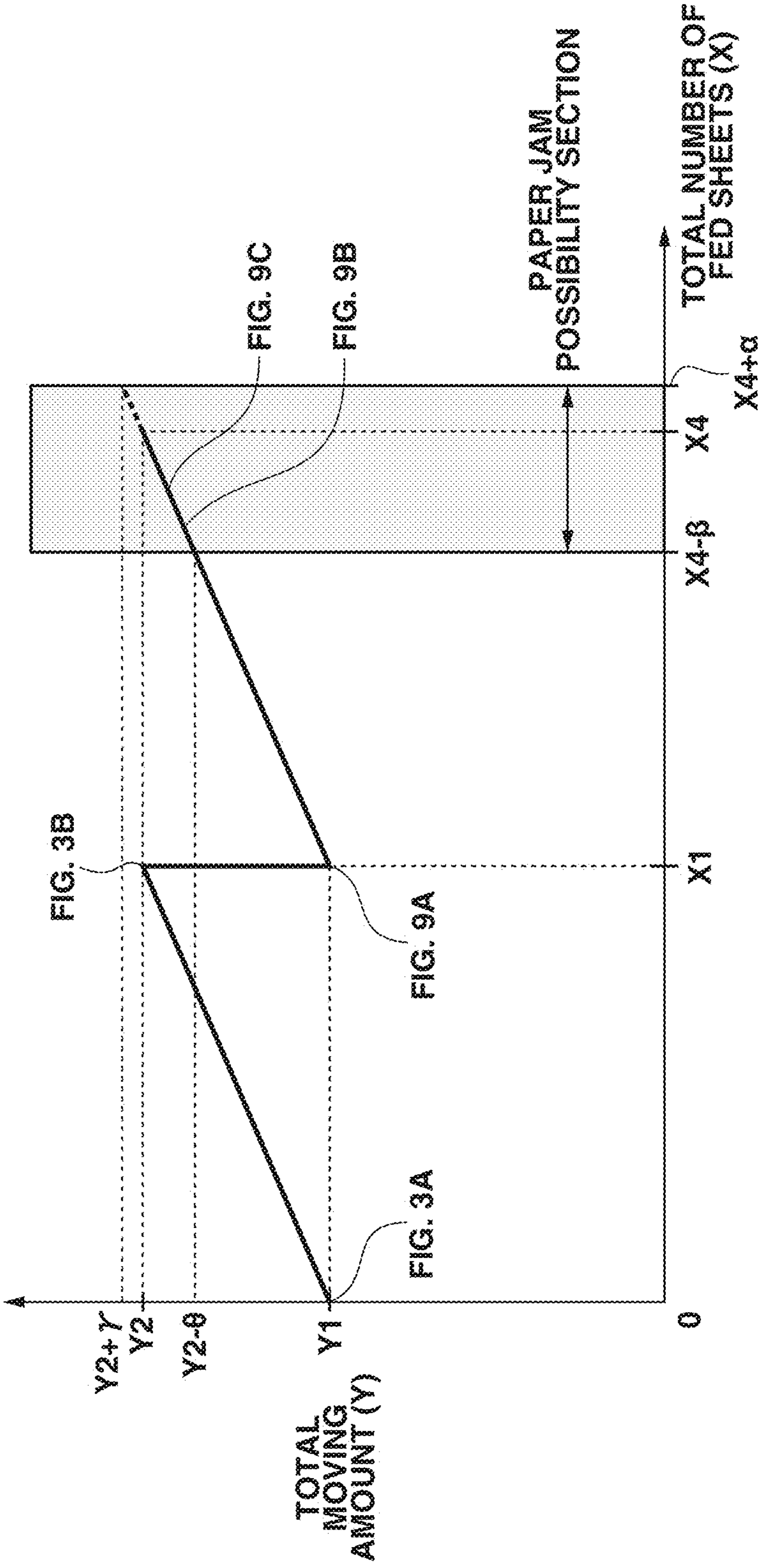
FIG. 10 illustrates a relation between the total moving amount and the total number of fed sheets according to the second example.

A method for identifying that a cause of a detected paper jam is the paper replenishment will be described below with reference to FIG. 10. FIG. 10 is a chart illustrating a relation between the total number of fed sheets (X) and the total moving amount (Y) according to the present example. When the total moving amount decreases by the paper replenishment and then reaches the value immediately before the paper replenishment again (the total number of fed sheets X4), in the present example, it is identified that the detected cause of the paper jam is the paper replenishment, like the first example. The present example differs from the first example in the method for defining a paper jam possibility section. In other words, the present example differs from the first example in the mechanism for detecting a paper jam. More specifically, in the first example, a paper jam is detected based on the distortion of the paper at the boundary of the paper replenishment. On the other hand, in the second example, a paper jam is detected based on the number of remaining replenished sheets. Accordingly, in the present example, a paper jam possibility section is defined as X4−β≤X≤X4 (α<β) based on the total number of fed sheets X4 when the total moving amount reaches the value immediately before the paper replenishment again.

Figure 11:
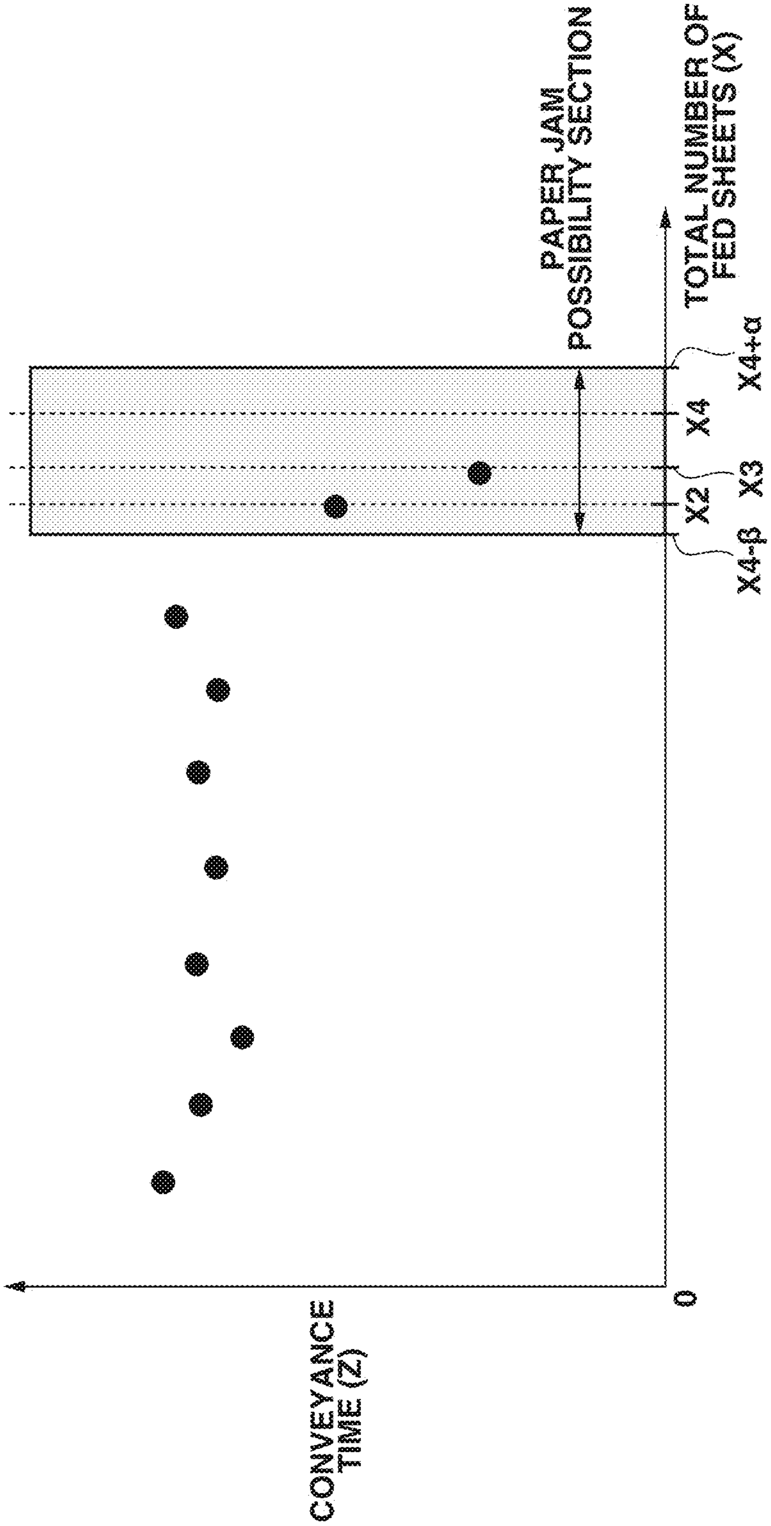
FIG. 11 illustrates a relation between conveyance time and the total number of fed sheets according to the second example.

Unlike the first example, according to the present example, the accuracy of analysis is improved by measuring the conveyance time for each fed sheet and using the data about the conveyance time. This method will be described below. According to the present example, the conveyance time is measured based on the above-described method using the first detection sensor 50, the second detection sensor 51, the third detection sensor 52. FIG. 11 is a chart illustrating a relation between the total number of fed sheets (X) and the conveyance time (Z) according to the present example. As illustrated by FIG. 11, if the conveyance time decreases by at least a predetermined amount before and after the total number of fed sheets exceeds X4−B, a cause of a paper jam is highly likely to be the paper replenishment. Thus, the identification accuracy can be improved by comparing the conveyance times before and after the sheet reaches a paper jam possibility section in addition to using the identification method according to the first example.

While the present disclosure has been described with reference to examples, it is to be understood that the disclosure is not limited to the disclosed examples. The scope of the following claims encompass all such modifications and equivalent structures and functions.

This application claims the benefit of Japanese Patent Application No. 2023-138695, filed Aug. 29, 2023, which is hereby incorporated by reference herein in its entirety.

What is claimed is:

1. A system including an image forming apparatus and at least one information processing apparatus, wherein the image forming apparatus includes:

a storage unit configured to store recording materials;

a feeding unit configured to feed the recording materials to be stored in the storage unit;

a support member configured to support the recording materials and to be movable between a reference position and a feeding position where the recording materials are fed by the feeding unit;

a control unit including a first detection unit configured to detect a movement of the support member from the reference position to the feeding position, and a second detection unit configured to detect a conveyance failure of the recording materials; and a transmission unit configured to transmit data about the movement detected by the first detection unit and data about a detection result obtained by the second detection unit to the at least one information processing apparatus, wherein the at least one information processing apparatus includes a data storage unit configured to store the data about the movement detected by the first detection unit and the data about the detection result transmitted from the transmission unit, wherein the feeding position at a first time point is defined as a first position, the feeding position at a second time point later than the first time point is defined as a second position, and the feeding position at a third time point later than the second time point is defined as a third position, wherein an amount of movement required for the support member to be moved from the reference position to the first position is defined as a first movement amount, wherein an amount of movement required for the support member to be moved from the reference position to the second position is defined as a second movement amount, wherein an amount of movement required for the support member to be moved from the reference position to the third position is defined as a third movement amount, and wherein, in a case where the second movement amount is smaller than the first movement amount, the third movement amount is included in a predetermined threshold value range including the first movement amount, and the conveyance failure of the recording materials fed at the third time point is detected by the second detection unit, the at least one information processing apparatus notifies a display unit so that the display unit displays information about replenishment of the recording materials based on the data about the movement detected by the first detection unit and the data about the detection result stored in the data storage unit.

2. The system according to claim 1, wherein the image forming apparatus includes a drive unit configured to drive the support member, and wherein the data about the movement detected by the first detection unit is indicative of a number of pulse signals input to the drive unit.

3. The system according to claim 1, wherein the image forming apparatus includes a drive unit configured to drive the support member, and wherein the data about the movement detected by the first detection unit is indicative of driving time of the drive unit.

4. The system according to claim 1, further comprising:

a device other than the image forming apparatus, and wherein the device includes the display unit configured to display the information based on the result of the analysis.

5. The system according to claim 1, wherein the image forming apparatus includes the display unit.

6. The system according to claim 1, wherein the information includes a countermeasure for the conveyance failure.

7. The system according to claim 1, wherein the image forming apparatus includes a third detection unit configured to detect that the recording materials has passed through a conveyance path, wherein the control unit measures conveyance time after the recording materials are conveyed to the feeding unit and until the third detection unit detects the recording materials, and wherein, in a case where the conveyance time is not included in a predetermined threshold value, the second detection unit detects that a conveyance failure of the recording materials occurs.

8. The system according to claim 7, wherein the transmission unit transmits data about the conveyance time to the at least one information processing apparatus, and wherein, based on the data about the movement, the data about the detection result, and the data about the conveyance time, the at least one information processing apparatus notifies the display unit so that the display unit displays the information.

9. At least one information processing apparatus for communicating with an image forming apparatus, wherein the image forming apparatus includes:

a storage unit configured to store recording materials;

a feeding unit configured to feed the recording materials to be stored in the storage unit;

a support member configured to support the recording materials and to be movable between a reference position and a feeding position where the recording materials are fed by the feeding unit;

a control unit including a first detection unit configured to detect a movement of the support member from the reference position to the feeding position, and a second detection unit configured to detect a conveyance failure of the recording materials; and a transmission unit configured to transmit data about the movement detected by the first detection unit and data about a detection result obtained by the second detection unit to the at least one information processing apparatus, wherein the at least one information processing apparatus includes:

a data storage unit configured to store the data about the movement and the data about the detection result transmitted from the transmission unit;

wherein the feeding position at a first time point is defined as a first position, the feeding position at a second time point later than the first time point is defined as a second position, and the feeding position at a third time point later than the second time point is defined as a third position, wherein an amount of movement required for the support member to be moved from the reference position to the first position is defined as a first movement amount, wherein an amount of movement required for the support member to be moved from the reference position to the second position is defined as a second movement amount, wherein an amount of movement required for the support member to be moved from the reference position to the third position is defined as a third movement amount, and wherein, in a case where the second movement amount is smaller than the first movement amount, the third movement amount is included in a predetermined threshold value range including the first movement amount, and the conveyance failure of the recording materials fed at the third time point is detected by the second detection unit, the at least one information processing apparatus notifies a display unit so that the display unit displays information about replenishment of the recording materials based on the data about the movement detected by the first detection unit and the data about the detection result stored in the data storage unit.

10. An image forming apparatus comprising:

a storage unit configured to store recording materials;

a feeding unit configured to feed the recording materials to be stored in the storage unit;

a support member configured to support the recording materials and to be movable between a reference position and a feeding position where the recording materials are fed by the feeding unit;

a control unit including a first detection unit configured to detect a movement of the support member from the reference position to the feeding position, and a second detection unit configured to detect a conveyance failure of the recording materials; and a notification unit configured to notify a display unit information, wherein the feeding position at a first time point is defined as a first position, the feeding position at a second time point later than the first time point is defined as a second position, and the feeding position at a third time point later than the second time point is defined as a third position, wherein an amount of movement required for the support member to be moved from the reference position to the first position is defined as a first movement amount, wherein an amount of movement required for the support member to be moved from the reference position to the second position is defined as a second movement amount, wherein an amount of movement required for the support member to be moved from the reference position to the third position is defined as a third movement amount, and wherein, in a case where the second movement amount is smaller than the first movement amount, the third movement amount is included in a predetermined threshold value range including the first movement amount, and the conveyance failure of the recording materials fed at the third time point is detected by the second detection unit, the notification unit notifies the display unit so that the display unit displays information about replenishment of the recording materials based on the data about the movement detected by the first detection unit and the data about the detection result obtained by the second detection unit.

* * * * *